No. 828,530. PATENTED AUG. 14, 1906.
W. BROTHERS.
REFRIGERATING APPARATUS.
APPLICATION FILED SEPT. 21, 1901.
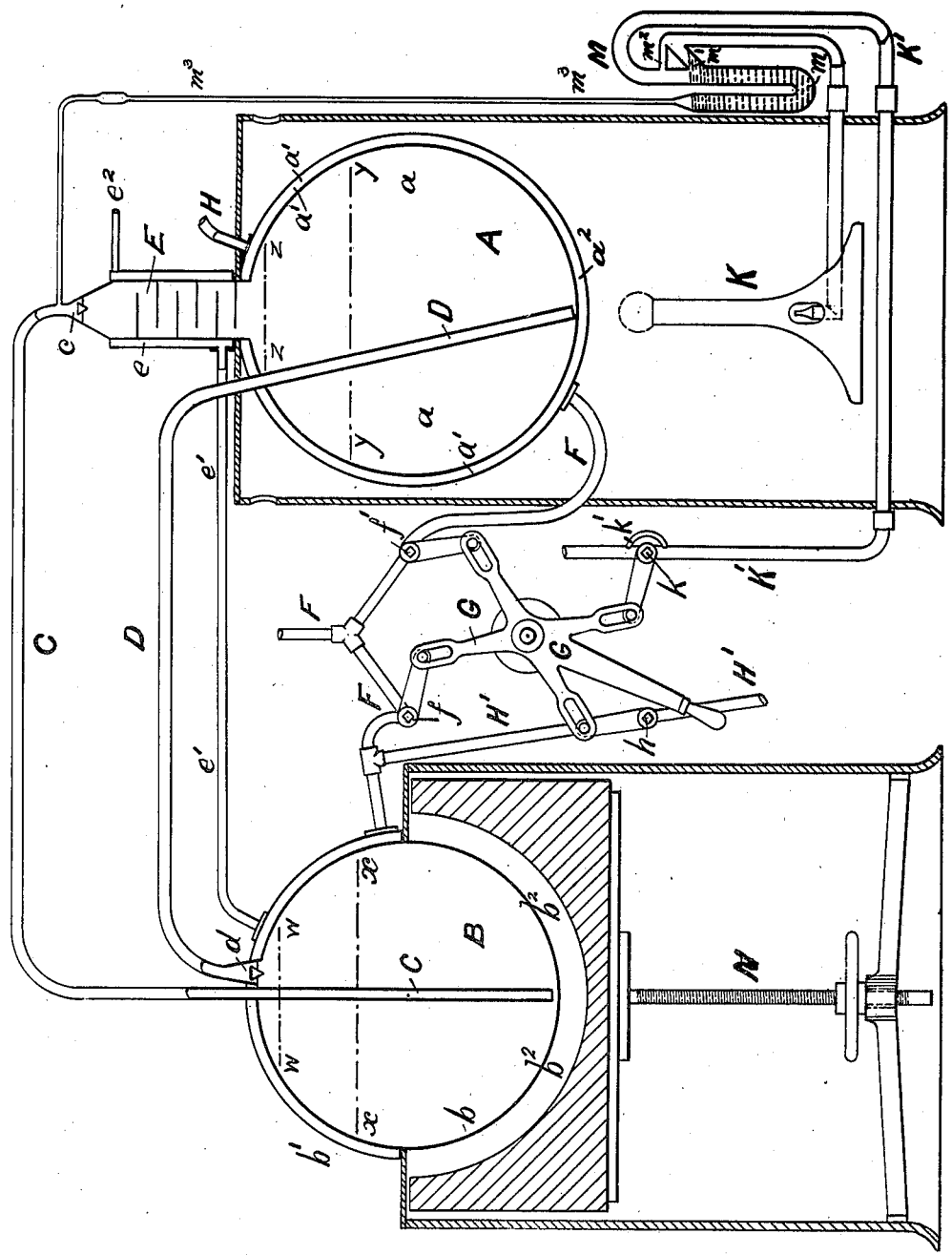
WITNESSES.
Joseph Bates.
E. Howard.
INVENTOR.
William Brothers
by O'Brien O'Brien
atty.

UNITED STATES PATENT OFFICE.

WILLIAM BROTHERS, OF PRESTWICH, ENGLAND.

REFRIGERATING APPARATUS.

No. 828,530.  Specification of Letters Patent.  Patented Aug. 14, 1906.

Application filed September 21, 1901. Serial No. 76,117.

*To all whom it may concern:*

Be it known that I, WILLIAM BROTHERS, a British subject, and a resident of Prestwich, in the county of Lancaster, England, have invented certain new and useful Improvements in Refrigerating Apparatus, of which the following is a specification.

This invention is designed to produce a simple, effective, and reliable apparatus for making ice, either in small or large quantities, by the evaporation of ammonia-gas from an aqueous solution of ammonia without the use of pressure above the atmospheric pressure.

The invention consists in the production or formation of intense cold for refrigerating purposes without pressure or the production of anhydrous or liquefied ammonia and in apparatus constructed with two chambers connected together containing water and charged with ammonia-gas, which is alternately drawn from one chamber to the other without exceeding atmospheric pressure.

The invention will be fully described with reference to the accompanying drawing, which is a sectional elevation of the apparatus.

The apparatus is constructed with two vessels A and B, connected together by pipes C and D to contain an aqueous solution of ammonia. The ammonia under the influence of heat is alternately driven off from the vessel A through the pipe C and absorbed in the vessel B and on the removal of the heat is drawn back from the vessel B and reabsorbed in the vessel A, the process of evaporation taking place in the vessel B reducing the temperature to the desired degree.

The ammonia vessel A is constructed with an inner chamber $a$ and an outer chamber or jacket $a'$, surrounding the inner one. The inner one, $a$, is filled up to about the line $z\,z$ with a saturated solution of ammonia, and the outer one, $a'$, forms a water-jacket through which cold water can be circulated when it is desired to cool the solution. The second ammonia or refrigerating vessel B is constructed with three chambers—an inner one $b$, an outer chamber or jacket $b'$, and an ice-chamber $b^2$. The inner chamber $b$ is filled to about the line $x\,x$ with pure water. The chamber $b'$ forms a water-jacket through which cold water can be circulated when it is desired to prevent the rise of temperature in the inner chamber $b$, and the third chamber $b^2$ forms a receptacle for water (or other material) to be frozen into ice or cooled.

The vessels A and B may be of spherical or cylindrical form and made of copper or other suitable material.

The inner chamber $a$ of the vessel A is connected with the inner chamber $b$ of the vessel B by two pipes C and D, through which ammonia-gas can pass or be forced from one chamber to the other when the apparatus is in operation. The ammonia-gas flows from the chamber $a$ to the chamber $b$ through the pipe C, which is provided with a non-return valve $c$, and from the chamber $b$ back to the chamber $a$ through the pipe D, which is also provided with a non-return valve $d$. The pipe C is connected to the top of the chamber $a$ and is carried down nearly to the bottom of the chamber $b$ to deliver the gas at the bottom of the liquid in the vessel, and in a similar manner the pipe D connects with the top of the chamber $b$ and extends down nearly to the bottom of the chamber $a$ to deliver the gas below the liquid.

Above the ammonia vessel A is placed a dehydrator E of any suitable form, through which the ammonia-gas passes on its way to the refrigerating vessel B for the purpose of freeing the gas from any steam or aqueous vapor that may evaporate with it.

The water chambers or jackets $a'$ and $b'$ are connected with a water-supply pipe F, from which cold water can be run or circulated through them. The pipe F is fitted with two taps $f\,f'$ to control the flow of water, and the two taps are connected by a lever G or otherwise, so that one only can be open at a time. The water-jacket $a'$ is provided with a waste-water pipe H and the jacket $b'$ with a waste-water or drain pipe H'. The dehydrator E is also provided with a water-jacket $e$, through which cold water can circulate. This may be connected with the water-supply pipe; but in order to economize water and simplify the apparatus it is preferably connected by the pipe $e'$ with the jacket $b'$, so that the water circulates first through the jacket $b'$ and then through the jacket $e$, escaping through the waste-water pipe $e^2$. The drain-pipe H' is fitted with a tap $h$, also connected to and operated by the lever G.

Below the ammonia vessel A is fitted a gas-burner K, by which it can be heated. The gas-burner is supplied with gas from a gas-supply pipe K', fitted with a tap $k$ and a by-pass $k'$. The tap $k$ is attached to and operated by the lever G.

The gas-supply pipe K' is provided with a regulating or controlling apparatus by which the supply of gas to the burner K is cut off when the vacuum in the ice-chamber B has become so low as to indicate it is fully saturated or nearly saturated with the ammonia-gas driven off from the ammonia vessel A.

The gas-regulating apparatus M is formed with a U-tube $m$, filled with mercury, a gas-passage $m'$, a by-pass $m^2$, and a column of mercury in pipe $m^3$, connected to connecting-pipe C or otherwise where it will be affected by any vacuum in the apparatus. As the vacuum disappears the mercury rises up the U-tube $m$ and closes the passage $m'$, shutting off the supply of gas to the burner K except through the by-pass $m^2$, so that the inner vessels $a$ and $b$ are always kept under a partial vacuum.

In the arrangement shown in the drawing the ice or refrigerating chamber $b^2$ is placed externally to the chamber $b$ and is moved therefrom for the purpose of removing the ice. It is raised and lowered by a screw N.

In carrying out the operation the gas-jet is lighted and heat applied to the ammonia vessel A, and at the same time cold water is circulated around the ice vessel B in the jacket $b'$ and also through the jacket $e$ round the dehydrator E. The heat raises the temperature of the ammonia solution in the chamber $a$ and drives off the ammonia-gas through the dehydrator E and pipe C into the chamber $b$. The gas passes into the water in the chamber $b$ and is dissolved or absorbed therein. This continues until most of the ammonia-gas is driven off out of the ammonia solution in the ammonia vessel A and is absorbed in the water in the ice vessel B. When this has occurred, the liquor in the chamber $a$ has fallen approximately from the level of the line $z z$ to the level of the line $y y$ and the level of the liquor in the chamber $b$ has risen from the level of the line $x x$ to that of the line $w w$. If the vacuum in the apparatus nearly disappears by the continuance of the application of the heat to the vessel A, the mercury rises in the tube $m$ of the regulator M, cuts off the gas-supply, and shuts off or diminishes the flame. The operation is then reversed. The heat is shut off from the ammonia-chamber A and the cold water from the ice vessel B, and cold water is circulated around the ammonia-chamber A.

The reduction of temperature increases the vacuum in the chamber $a$ and by reason of the water having a great affinity for ammonia causes the ammonia-gas to rapidly evaporate from the solution in the vessel $b$ of the ice vessel B, pass into and be dissolved by the water in the vessel $a$, thereby producing the desired degree of cold in the ice vessel B.

The taps $f f'$ of the water-supply pipe F, the tap $h$ of the water-drain pipe H', and the tap $k$ of the gas-supply pipe K are all connected to the lever G, so that the water-supply tap $f$ and the gas-tap $k$ may be open together, while the other two $f'$ and $h$ remain closed, and the water-supply tap $f$ and the drain-tap $h$ may be opened only after the other two have been closed. By the movement of the handle G the operation can be reversed or stopped at any time.

What I claim as my invention, and desire to protect by Letters Patent, is—

In refrigerating apparatus the combination with the ammonia vessel A, the second ammonia vessel B and means for circulating water around them, the gas-burner K, dehydrator E, pipes C and D for the ammonia, of an external chamber $b^2$ in which the ice is formed, means for raising and lowering the ice-chamber $b^2$, the water-supply pipes F for supplying water to the chambers, the water-taps, $f f'$ on the water-pipes, F, the gas-supply pipe K', the gas-tap $k$ on the pipe K', the drain-pipe H' and drain-tap $h$ thereon and the lever G connected to the several taps to move the taps and reverse the operation of the apparatus simultaneously.

In witness whereof I have hereunto signed my name in the presence of two subscribing witnesses.

WILLIAM BROTHERS.

Witnesses:
   J. Owden O'Brien,
   B. Latham Woodhead.